Aug. 15, 1939.  E. MAY  2,169,566
MOTION PICTURE FILM DRIVE
Filed Jan. 21, 1938
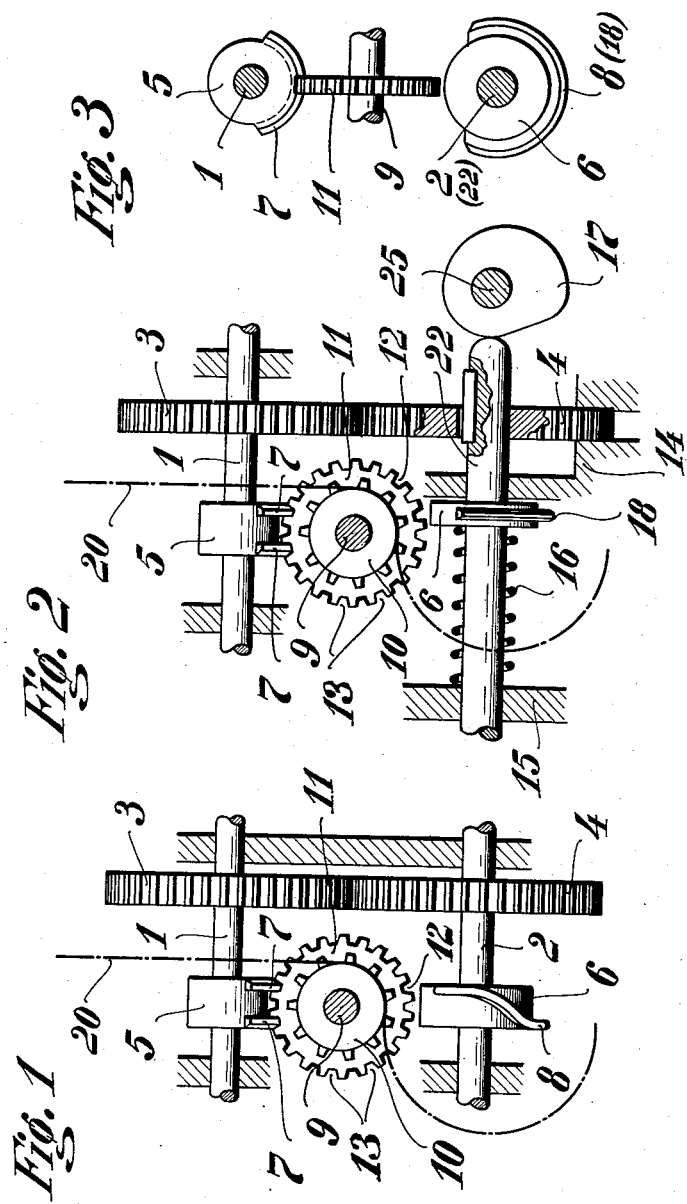
INVENTOR
*Erwin May*
BY
*Jean E. A. Konigsberg*
ATTORNEY Patented Aug. 15, 1939

2,169,566

UNITED STATES PATENT OFFICE 2,169,566

MOTION PICTURE FILM DRIVE

Erwin May, Wetzlar, Germany, assignor to Ernst Leitz, G. m. b. H., Wetzlar, Germany Application January 21, 1938, Serial No. 186,026

5 Claims. (Cl. 74—436)

This invention relates to improvements in driving means for the film transport roller in a motion picture projection machine and for like purposes.

It has been proposed to provide the shaft of the film transport roller with a star wheel which is driven from a shaft provided with a cam for rotating the star wheel and another cam for keeping the star wheel immovable while the film is projected. The spaces between the teeth in the star wheel are necessarily short so that when the one cam passes through said spaces to rotate the wheel it exerts great pressure upon the teeth which quickly wears them down. This in turn causes play between the two elements which results in uneven film projection.

The object of this invention is to provide an improved driving mechanism for the film transport roller whereby to reduce friction, wear and tear and obtain more even projection.

To this end the invention is embodied in a driving mechanism in which cams and guides for operating the star wheels are separated and mounted upon two shafts. The spaces between the teeth on the star wheel are alternately large and small. The larger spaces are for the engagement of the cam which rotates the star wheel and the film transport roller. The smaller or narrower spaces are engaged by rotating guides which holds the star wheel and film transport roller immovable while the picture is projected.

In the accompanying drawing illustrating the invention

Fig. 1 is a view of a film transport roller driving mechanism embodying the invention, with parts in section and parts removed.

Fig. 2 is a similar view showing a modification.

Fig. 3 is a detail view showing the relations of the cams and guides to the star wheel.

In Fig. 1 the reference numeral 10 indicates the film transport roller for driving the film 20. The roller is fast on a shaft 9 which carries a gear or star wheel 11 having teeth which are separated by spaces 12 and 13. The spaces or slits 12 are narrower than the spaces or slits 13 and said differently dimensioned slits alternate as shown. The frame of the projection machine is generally indicated at 14 and 15.

Above the shaft 9 there is suitably mounted a shaft 1 having a drum 5 provided with two guides 7, 7 the planes of which are perpendicular to the axis of the shaft 1. The guides 7 are spaced so as to simultaneously engage two narrow slits 12 in the star wheel as shown. Below the latter there is another shaft 2 with a drum 6 provided with an S-formed cam 8 adapted to engage in the wider slits 13 in the star wheel to rotate the latter and the roller 10 sufficiently to shift the film one picture length as will be understood. The two shafts 1 and 2 have intermeshing gears 3 and 4 for driving these shafts at the same speed. Either of the gears 3 and 4 may in turn be driven from the projection machine mechanism in any suitable manner not shown.

It is clear from Fig. 1 that so long as the rotating guides 7, 7 engage the star wheel, the latter and the film transport roller stands still so that the film can be projected. As soon as the guides 7 become disengaged from the star wheel, the latter is engaged by the cam 8 which causes sufficient rotation of the star wheel and the film transport roller to shift the film.

The modification in Fig. 2 consists in providing the second shaft 22 with a single guide 18 which is adapted to engage the wider slits 13 of the star wheel. The second shaft 22 is slidably supported in the framework 14 and 15 and is held against an actuating cam 17 upon a shaft 25 which is driven in any suitable manner not shown. A spring 16 presses against the guide 18 and thus keeps the shaft 22 in operative engagement with the actuating cam 17.

So long as the guides 7 engage the narrower slits 12 in the star wheel, the latter and the film transport roller 10 stand still and the film is projected. The timing is such that as the guides 7 leave the star wheel, the guide 18 engages a slit 13 in the star wheel and as said guide 18 rotates, the shaft 22 and the guide 18 are shifted transversely to the roller shaft 10 by the actuating cam 17 as will be understood. Hence the guide 18 causes the star wheel and the film transport roller to rotate sufficiently to shift the film one picture length between projection periods. When the guide 18 leaves the star wheel it is moved back into initial position by the cooperation of the cam 17 and the spring 16.

The mechanism herein disclosed has been found advantageous in that it includes the possibility of better dimensioning of the teeth on the star wheel to reduce friction and wear and tear. It also includes the advantages of employing star wheel actuating cams of relatively smaller radii whereby to flatten the curve of the film on the roller 10.

The invention includes within its scope the alternative construction of using two star wheels one for each of the guides and cam 7 and 8 and guide 18 respectively. Such alternative construction being rather obvious is not shown.

I claim:

1. In a motion picture machine, a film transport roller for operating the film, said roller having a period of rest while the film is projected and a period of rotation to shift the film between projection periods, a gear wheel in fixed relation to said roller, means to engage and hold the gear wheel and film transport roller immovable during projection periods, means for moving the holding means out of engagement with the gear wheel, longitudinally shiftable means for engaging the gear wheel to advance the film between projection periods when the holding means is out of engagement with said gear wheel, and means for actuating the shiftable means.

2. In a motion picture machine, a film engaging member for advancing the film, a gear connected to said member, shiftable means for intermittently engaging said gear to advance the film between projection periods, means for moving said shiftable means into engagement with said gear, means for moving said shiftable means out of engagement with said gear, means for holding said gear and thereby the film against movement in either direction when the shiftable means is out of engagement therewith, and means for actuating all of said parts.

3. In a motion picture machine, a film engaging member for advancing the film, a gear connected to said member, means for intermittently engaging and rotating said gear whereby to advance the film between projection periods, said means being normally biased in one direction, means for moving said last named means into operative engagement with said gear, holding means for the gear and film to prevent movement thereof in either direction during projection periods of the film, and means for actuating the holding means to cause intermittent engagement and disengagement with the gear at predetermined intervals.

4. In a motion picture machine, a film engaging member for advancing the film, a gear connected to said member, slidable means for intermittently engaging and rotating said gear whereby to advance the film between projection periods, a cam for engaging and actuating the slidable means, means for normally biasing the slidable means toward the cam, means for holding the gear to prevent movement of the film in either direction during the projection periods thereof, and means for continuously moving the holding means into and out of operative engagement with the gear at predetermined intervals.

5. In a motion picture machine, a film transport roller for operating the film, said roller having a period of rest while the film is projected and a period of rotation to shift the film between projection periods, a gear wheel in fixed relation to said roller, a continuously rotating member to engage and hold the gear wheel and film transport roller immovable during projection periods, a shaft for rotating said member to move the same into and out of engagement with the gear wheel, shiftable means for engaging the gear wheel to advance the film between projection periods when the said holding member is out of engagement with said gear wheel, a shaft for actuating the shiftable means, intermeshing gears on the said two shafts, and means on the second named shaft for moving the shiftable means axially independently of the first named shaft.

ERWIN MAY.